United States Patent
Sisk et al.

(10) Patent No.: US 7,685,084 B2
(45) Date of Patent: Mar. 23, 2010

(54) TERM EXPANSION USING ASSOCIATIVE MATCHING OF LABELED TERM PAIRS

(75) Inventors: Jacob Sisk, Los Angeles, CA (US); Heidi Eldenburg Bramlet, Pasadena, CA (US); Daniel C. Fain, Los Angeles, CA (US); Jianchang Mao, San Jose, CA (US); Charity A. Rieck, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 469 days.

(21) Appl. No.: 11/673,355

(22) Filed: Feb. 9, 2007

(65) Prior Publication Data

US 2008/0195596 A1  Aug. 14, 2008

(51) Int. Cl.
G06F 17/00 (2006.01)
(52) U.S. Cl. .............................. 706/45; 706/46; 706/47; 706/12; 707/3; 707/5
(58) Field of Classification Search .................. 706/20, 706/45
See application file for complete search history.

(56) References Cited

U.S. PATENT DOCUMENTS

| | | | |
|---|---|---|---|
| 2002/0019763 A1* | 2/2002 | Linden et al. ................ 705/10 |
| 2003/0055816 A1* | 3/2003 | Paine et al. .................... 707/3 |
| 2004/0133471 A1* | 7/2004 | Pisaris-Henderson et al. . 705/14 |
| 2005/0223000 A1* | 10/2005 | Davis et al. ..................... 707/5 |
| 2005/0234879 A1* | 10/2005 | Zeng et al. ...................... 707/3 |
| 2005/0234953 A1* | 10/2005 | Zhang et al. ................. 707/101 |
| 2005/0240557 A1* | 10/2005 | Rorex et al. .................... 707/1 |
| 2005/0240580 A1* | 10/2005 | Zamir et al. .................... 707/4 |
| 2005/0278241 A1* | 12/2005 | Reader ......................... 705/37 |
| 2005/0283470 A1* | 12/2005 | Kuntzman et al. ............. 707/4 |
| 2005/0289120 A9* | 12/2005 | Soulanille et al. .............. 707/3 |
| 2006/0004628 A1* | 1/2006 | Axe et al. ..................... 705/14 |
| 2006/0010105 A1* | 1/2006 | Sarukkai et al. ................ 707/3 |
| 2006/0020516 A1* | 1/2006 | Choi et al. .................... 705/26 |
| 2006/0206516 A1* | 9/2006 | Mason ...................... 707/102 |
| 2006/0293948 A1* | 12/2006 | Weinblatt .................... 705/14 |
| 2007/0033103 A1* | 2/2007 | Collins et al. ................. 705/14 |

(Continued)

OTHER PUBLICATIONS

Finley, T. and Joachims, T. 2005. Supervised clustering with support vector machines. In Proceedings of the 22nd international Conference on Machine Learning (Bonn, Germany, Aug. 7-11, 2005). ICML '05, vol. 119. ACM, New York, NY, 217-224.*

Nikhil Bansal, Avrim Blum, Shuchi Chawla, "Correlation Clustering," focs, pp. 238, The 43rd Annual IEEE Symposium on Foundations of Computer Science (FOCS'02), Nov. 2002.*

(Continued)

Primary Examiner—David R Vincent
Assistant Examiner—D H Kim
(74) Attorney, Agent, or Firm—Seth H. Ostrow; Ostrow Kaufman & Frankl LLP (57) ABSTRACT

Various embodiments are directed to a system and method providing associative matching of terms. Candidate terms are selected for building one or more associative matching models from one or more selected candidate sources. Associativity is defined to give editors the ability to label sample associative term pairs from the one or more candidate sources. The editors label sample candidate term pairs as being related. Features are determined that can differentiate associative from non-associative pairs. The selected features are used to build a model. The model is applied to determine whether a received query-candidate pair are associative.

28 Claims, 6 Drawing Sheets

U.S. PATENT DOCUMENTS

| | | | |
|---|---|---|---|
| 2007/0033105 A1* | 2/2007 | Collins et al. | 705/14 |
| 2007/0143176 A1* | 6/2007 | Nong et al. | 705/14 |
| 2007/0143278 A1* | 6/2007 | Srivastava et al. | 707/5 |
| 2008/0004947 A1* | 1/2008 | Mathew et al. | 705/14 |
| 2008/0077585 A1* | 3/2008 | Li et al. | 707/6 |
| 2008/0097821 A1* | 4/2008 | Chickering et al. | 705/10 |
| 2008/0195596 A1* | 8/2008 | Sisk et al. | 707/5 |

OTHER PUBLICATIONS

Sergey Brin, Lawrence Page, The anatomy of a large-scale hypertextual Web search engine, Computer Networks and ISDN Systems, vol. 30, Issues 1-7, Proceedings of the Seventh International World Wide Web Conference, Apr. 1998, pp. 107-117.*

Roweis et al. Nonlinear dimensionality reduction by locally linear embedding. Science, v.290 No. 5500, Dec. 22, 2000. pp. 2323-2326.*

* cited by examiner

| Keywords | Category | Monthly Search Volume | Your Max Bid ($) | Pos. | Top 3 Max bids | Est. Clicks* | Est. CPC* | Est. Cost* |
|---|---|---|---|---|---|---|---|---|
| mp3 players | mp3 | 538,997 | 2.01 | 1 | 2.00 1.33 1.01 0.54 0.53 Bid Tool | 17,714 | 2.01 | 35,605.14 |
| portable mp3 players | mp3 | 240,254 | 2.01 | 1 | 2.00 0.48 0.48 0.39 0.38 Bid Tool | 10,425 | 2.01 | 20,954.25 |
| best mp3 player | mp3 | 36,877 | 1.01 | 1 | 1.00 0.74 0.41 0.40 0.39 Bid Tool | 493 | 1.01 | 497.39 |
| free mp3 players | mp3 | 5,833 | 0.28 | 1 | 0.27 0.26 0.25 0.17 0.15 Bid Tool | 535 | 0.28 | 149.80 |
| free mp3 player download | mp3 | 2,347 | 0.16 | 1 | 0.15 0.15 0.12 0.11 0.10 Bid Tool | 160 | 0.16 | 25.60 |

Estimated Monthly Cost: $57,172.12
Estimated Daily Cost: $1,905.74

TERM EXPANSION USING ASSOCIATIVE MATCHING OF LABELED TERM PAIRS

CROSS REFERENCE TO RELATED APPLICATIONS

The present application is related to the following U.S. patent applications:

U.S. patent application Ser. No. 11/365,315, entitled "SYSTEM AND METHOD FOR IDENTIFYING RELATED QUERIES FOR LANGUAGES WITH MULTIPLE WRITING SYSTEMS," filed on Feb. 28, 2006;

U.S. patent application Ser. No. 11/598,239, entitled "SYSTEM AND METHOD FOR GENERATING SUBSTITUTABLE QUERIES," filed on Nov. 9, 2006;

U.S. patent application Ser. No. 11/600,603, entitled "SYSTEM AND METHOD FOR GENERATING SUBSTITUTABLE QUERIES BASED ON THE BASIS OF ONE OR MORE FEATURES," filed on Nov. 15, 2006;

U.S. patent application Ser. No. 11/432,764, entitled "EFFICIENT METHOD FOR BUILDING SUPPORT VECTOR MACHINES WITH REDUCED CLASSIFIER COMPLEXITY," filed on May 10, 2006;

U.S. patent application Ser. No. 10/949,821, entitled "METHOD AND APPARATUS FOR EFFICIENT TRAINING OF SUPPORT VECTOR MACHINES," filed on Sep. 24, 2004;

U.S. patent application Ser. No. 11/394,744, entitled "Large Scale Semi-Supervised Linear Support Vector Machines," filed on Mar. 31, 2006;

U.S. patent application Ser. No. 11/122,780, entitled "SYSTEM AND METHODS FOR IDENTIFYING THE POTENTIAL ADVERTISING VALUE OF TERMS FOUND ON WEB PAGES," filed on May 5, 2005.

the disclosures of which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

In today's on-line search engines, relevance of sponsored results to user intent drives performance across many applications. The Yahoo!® search engine is an example. Previously, search engines restricted relevance to very tight semantic similarity, such as spelling corrections or synonyms. However, these systems do not account for the fact that other kinds of relevance may capture the economically salient part of user intent, or, like traditional advertising, help to generate a new intent or desire on the part of the user. Terms that co-occur since they belong to complementary categories of products or services, to shared clusters of activities or tasks, shared (sub)cultures, tastes, styles, locations or temporalities are referred to herein as associative matches.

The business of placing advertisements in an online context is a process of determining user wants or needs that have some economic value. The user may not be conscious of what they want or need, and the latent desire (and accompanying economic activity) could be driven by an advertisement, the online context, the user herself, the state of the world at large, or some combination of all four.

In many cases the economic opportunity is clear. If a user searches for "HP 932C printer cartridge" it is reasonable to assume that replacement parts for the specific brand and model of printer form a reasonable set of value propositions. In this case it is likely that advertisements based on phrases typed into a search engine that are all semantically relevant to the printer part in question perform better than other advertisements. In the case of a sponsored search in a search engine, the economic intent of the user (buying a new printer cartridge for his or her printer, for example) may be sufficiently clear.

In many instances, however, the economic intent of a user is less clear. For example, user intent may be ambiguous because the user is not directly performing an economic activity (reading news rather than searching for products) or because an error has occurred (the user has landed on a parked domain), or simply because there is no clear economic intent found in the query itself that the user provides.

In addition to the foregoing, there are many situations where directly relevant advertisements are not appropriate since relevant advertisements may cannibalize, or otherwise compete with, some other primary revenue stream associated with a content item. For example, a provider of an auction web site, such as Yahoo! Auction pages, may wish to refrain from advertising products that compete with auction results, which could anger or otherwise frustrate sellers.

Accordingly, given the above-discussed shortcomings in existing systems, there is a need for systems and methods for performance of associative matching, which may provide mechanisms for increasing coverage of the display of advertisements while maintaining plausible relevance.

SUMMARY OF THE INVENTION

Briefly, and in general terms, various embodiments are directed to systems and methods for providing associative matching of terms. In one embodiment, candidate terms are selected for building one or more associative matching models from one or more selected candidate sources. Editors label or otherwise score sample associative term pairs from the one or more candidate sources, which may be referred to as "training data," providing an indication as to whether a given candidate term pair is an associative match. Features are determined that differentiate associative from non-associative pairs, which are used to train a model. The model may be applied to an unknown term (or query) to produce a set of candidate pairs, which may be ranked according to the a likelihood that a given candidate is an associative match according to the model.

BRIEF DESCRIPTION OF THE DRAWINGS

These and other features of the present invention will become apparent through consideration of the detailed description of the invention, when considered in conjunction with the drawing Figures, in which.

DETAILED DESCRIPTION OF THE PREFERRED EMBODIMENTS

Embodiments of the present invention are directed towards systems and methods that provide for the associative matching of terms. In search engines, for example, associative matching may identify value propositions that are associated with a query or keyword that a user provides as input. By way of example only, and not by way of limitation, these associations may be by task, taste, community, temporality, locality, or related to any association that represents shared economic activity or the like. In this respect, associative matching may be useful when the context of a keyword that a user provides to a search engine is ambiguous. In the context of targeted advertising, a user is not necessarily searching (in the economic sense) for a value proposition, and hence serendipitous discovery of value (by association) presents an opportunity to advertisers and the like. For example, where the user is reading a story on a news website, such as CNN, about luxury travel in Tuscany, advertisements for products also consumed by Tuscan luxury travelers (luxury goods, fine dining, financial services, etc) may be more useful to the user than Tuscan wines or Tuscan recipes. Some queries contain embedded demographic, taste and stylistic cues. The same user searching for luxury travel in Tuscany may more likely to respond positively to advertisements for cruises, other luxury goods and fine foods than advertisements for bankruptcy lawyers or skateboards.

Associative matching, also referred to as "associativity," may generally be described as two terms that share some degree of an economic association. Some exemplary criteria for a given associative match may include, but are not limited to:

Y is associative to X if people consume X and Y around the same time.

Y is associative to X if people consume X and Y in the same place.

Y is associative to X if the same sorts of people consume X and Y.

Y is associative to X if consumption of X has no value or less value unless Y is consumed as well.

Y is associative to X if both X and Y are needed for some task.

Y is associative to X if taste for Y is typical of people with taste for X.

These example associative matches capture relationships based on temporal, local, cultural and task associations of the consumption of goods and services, and are economic in type. Other economic-based criteria for a given associative match may include, by way of example and not limitation:

Y is associative to X if people who buy X also buy Y.

Y is associative to X if Y is an economic complement for X.

Y is associative to X if people who consume X consume both X and Y but not either X or Y.

Associative matches may have value that is inversely proportional to the noise inherent in any sponsored search context when trying to discover user intent, wants or needs. In this regard, associative matching may be most useful in cases where lateral or expansive thinking (serendipitous discovery of potential user value) on the part of the user provides economic value, rather than a goal directed search. Thus, content match and domain match businesses are ideal candidates for associative matching.

Referring now to the drawings, wherein like reference numerals denote like or corresponding parts throughout the drawings and, more particularly to FIGS. 1 through 6, there are shown various embodiments of systems and methods for associative matching. In one embodiment, as an example, and not by way of limitation, an improvement in Internet search engine categorization, selection and scoring of content items, such as web pages, is provided. The World Wide Web is a distributed database comprising billions of data records accessible through the Internet. Search engines are commonly used to search the information available on computer networks, such as the World Wide Web, to enable users to locate data records of interest.

Figure 1:
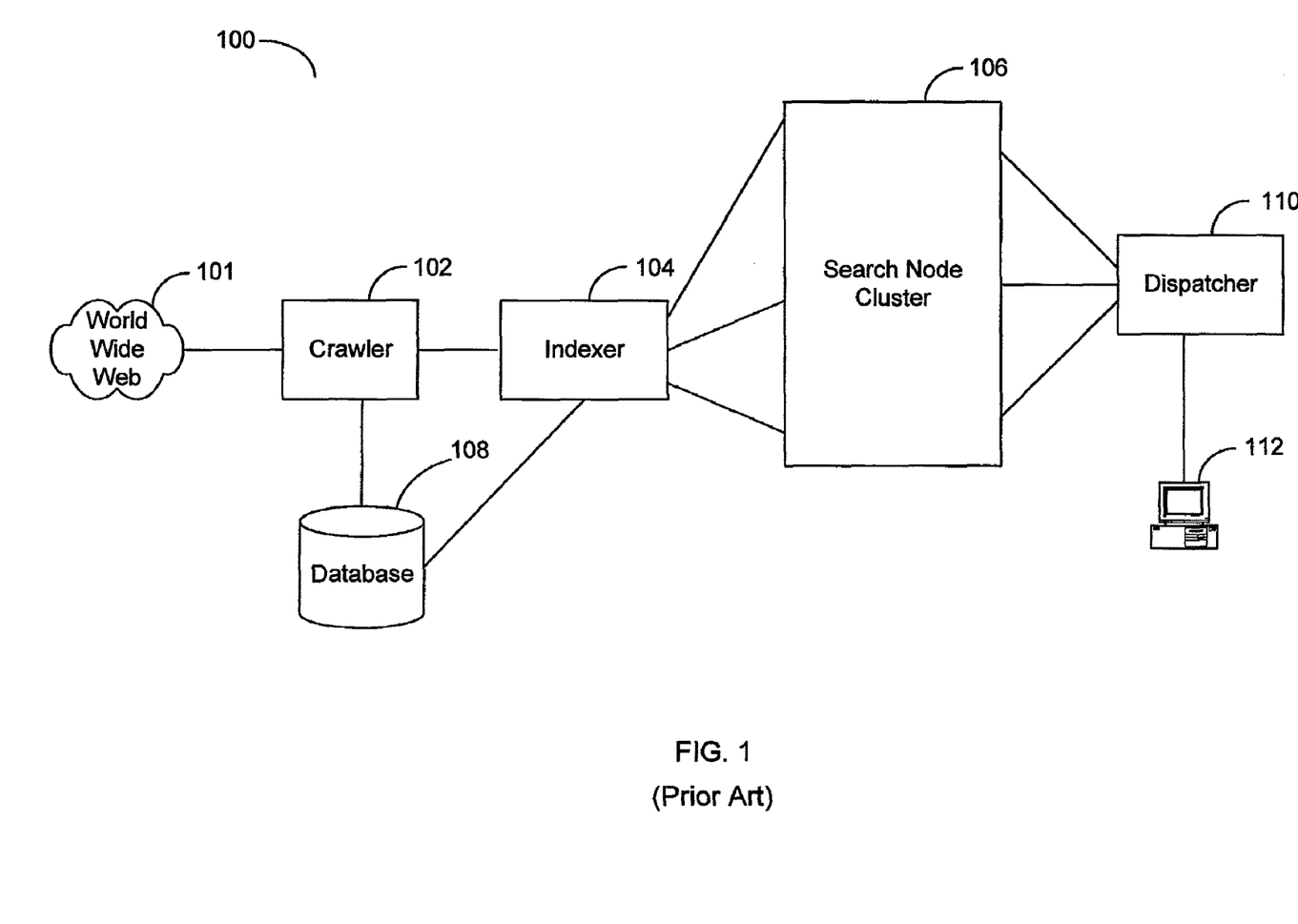
FIG. 1 is a block diagram illustrating components of a system for performing associative matching according to one embodiment of the present invention.

A search engine system 100 is shown in FIG. 1. Web pages, hypertext documents, and other content items from a source 101, accessible via the Internet or other network, are collected by a crawler 102. For example, the crawler 102 may follow hyperlinks in a collected hypertext document to collect other hypertext documents. The content items (or references to content items) that the crawler 102 retrieves are stored in a database 108. Thereafter, these content items or references thereto are parsed by an indexer 104, which builds a searchable index of the content items in database 108. Common prior art methods for indexing may include inverted files, vector spaces, suffix structures, and hybrids thereof. For example, a given web page may be broken down into words and respective locations of each word on the page. The pages may be indexed by the words and respective locations. Furthermore, a primary index of the database 108 may be broken down into a plurality of sub-indices, with a given sub-index sent to a search node in a search node cluster 106.

To use search engine 100, a user 112 typically enters one or more search terms or keywords, which are sent to a dispatcher 110. Dispatcher 110 computes or otherwise determines a list of one or more search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 112 sorted by relevance scores, which may be a function of the query itself and the type of document produced. Factors that affect the relevance score for a given content item may include, but are not limited to: a static relevance score such as link cardinality and page quality, placement of the search terms in the content item, such as titles, metadata, and document web address, document rank, such as a number of external content items that refer to the content item and the "level" of the external content items, and document statistics such as query term frequency in the document, global term frequency, and term distances within the document. For example, Term Frequency Inverse Document Frequency ("TFIDF") is a statistical technique that is suitable for evaluating the importance of a word is to a content item, such as a document. According to TFIDF, the importance of a word increases proportionally to the number of times a word appears in the document, but is offset by how common the word is in all of the documents in the corpus of documents from which the document is selected.

Figure 2:
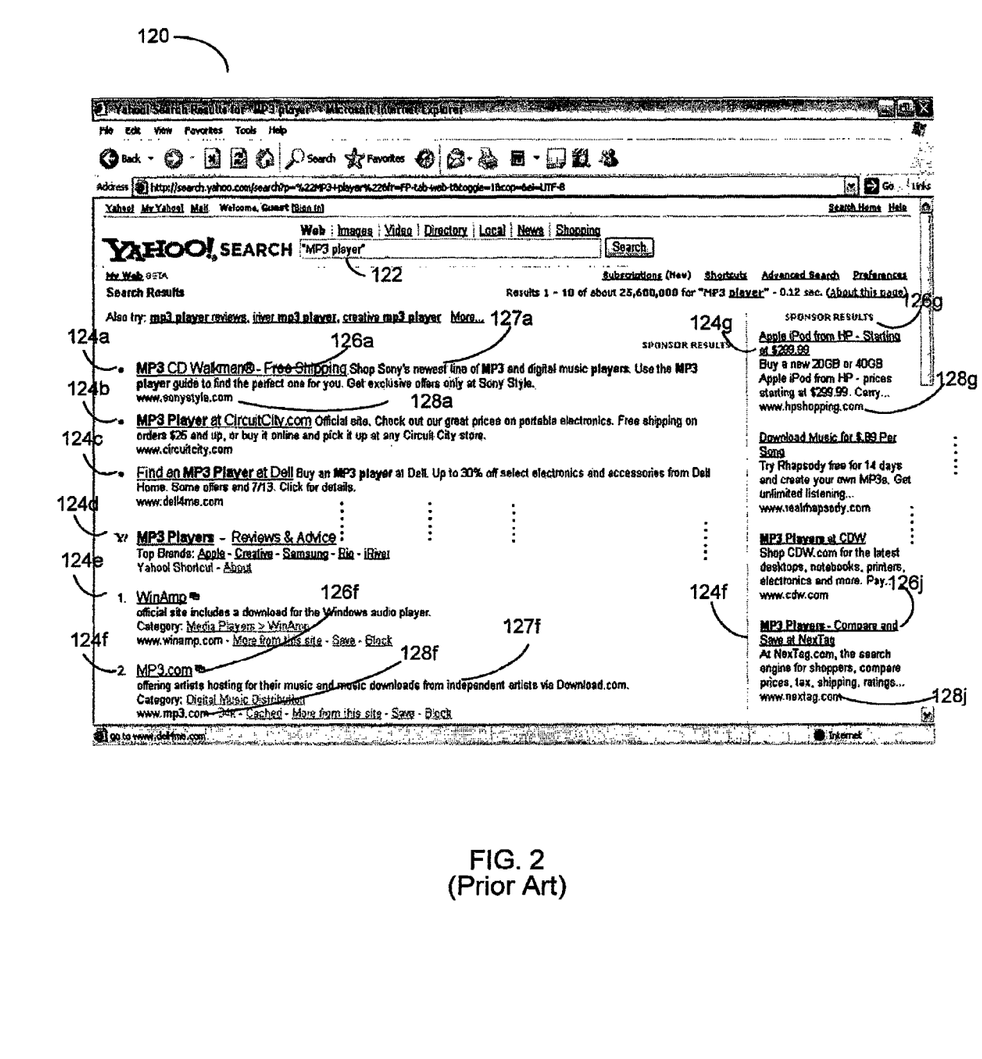
FIG. 2 is an example of a result set produced by the search engine system according to one embodiment of the present invention.

Referring to FIG. 2, there is shown an exemplary result set 120 produced by one embodiment of the search engine system of the present invention. As shown by FIG. 2, in response to a query 122 comprising the search term "MP3 player," the search engine searches its web index and produces a set of one or more results in the form of a result set 120 for display to a user. For brevity, only a first page of the result set 120 is shown. Result set 120 includes six results 124a-f, each with a respective clickable hyperlink 126a-f, description 127a-f, and Internet addresses or uniform resource locator ("URL") 128a-f that identify content items that are responsive to the query 122. It is important to ensure that the documents displayed to the user are ordered according to relevance, with the most relevant displayed at the start of the result set, e.g., the most relevant content item at position one in the result set. The result set may be ranked in accordance with a relevance function, such as a relevance function described in U.S. patent application Ser. No. 10/424,170, entitled "METHOD AND APPARATUS FOR MACHINE LEARNING A DOCUMENT RELEVANCE FUNCTION," filed on Apr. 25, 2003, the disclosure of which is incorporated by reference herein in its entirety.

In addition to displaying search results sorted by a relevance score, a search engine may display sponsored results 124a-c and 124g-j, which are pay-for-placement listings paid for by web page operators such as advertisers. An advertiser agrees to pay an amount of money to the search engine operator, commonly referred to as the bid amount, in exchange for a particular position in a set of search results that is generated in response to a user's input of a particular search term. A higher bid amount results in more prominent placement of the advertisement in a set of sponsored search results. Advertisers adjust their bids or bid amounts to control the position at which their search listings are presented in the sponsored search results. The pay-for-placement system places search listings having higher-value bids higher or closer to the top of the sponsored search listings 124a-c, which may continue down a "right rail" of a search result page, for example, as results 124g-j. More prominent listings are potentially seen by more users and are therefore more likely to be clicked through, producing a traffic stream of potential customers to the advertiser's web site.

Focusing on sponsored result 124a, the given sponsor listing may include a clickable hyperlink title 126a (including the anchor text "MP3 CD Walkman®"), descriptive text 127a, and a URL (www.sonystyle.com) 128a. Search engine 100 may store such sponsor listings, each associated with an advertiser or a web page operator, in database 108.

Figure 3:
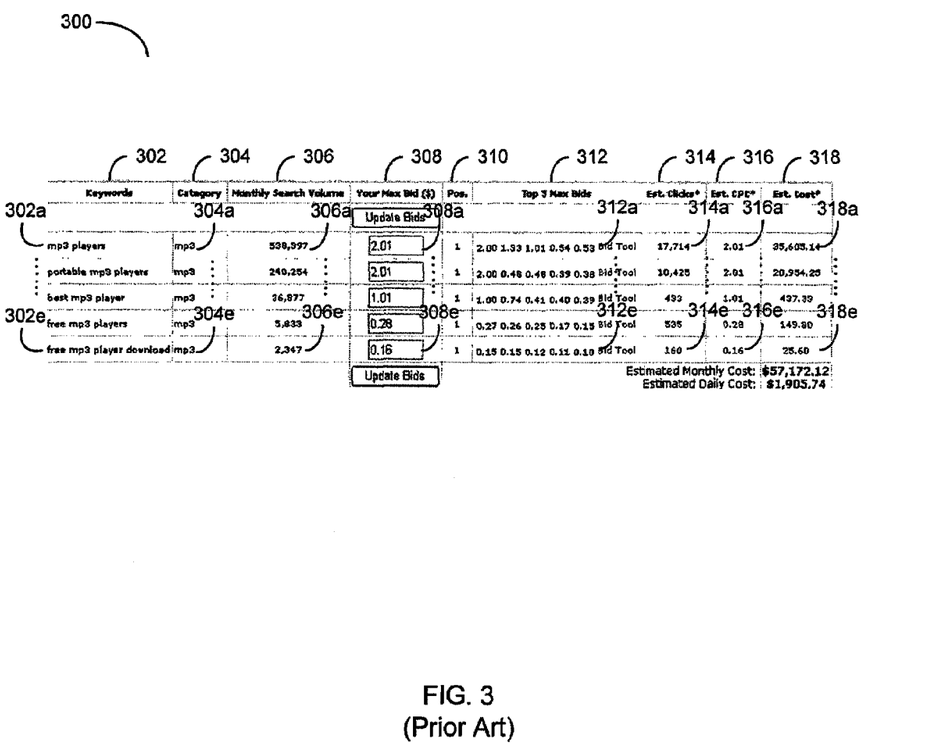
FIG. 3 is a screen diagram illustrating a set of bidded search terms for use by a search engine according to one embodiment of the present invention.

The operator of the search engine system provides tools suitable for use in pay-for-placement systems to help an advertiser manage their bids and attract traffic. Referring to FIG. 3, there is shown an exemplary bidding tool 300. By way of example only, bidding tool 300 may include keywords 302, categories 304, monthly (or any other time period) search volumes 306 for a given search term, maximum bids 308, positions 310, top five max bids 312, estimated monthly clicks 314, estimated monthly cost per click 316, and estimated monthly cost 318.

Keyword 302 may be a search term, such as a word or a phrase, that relates to advertiser's business and describes its products or services, such as those presented in an advertisement. Category 304 identifies a grouping of keywords that are similar in a particular way (e.g., product type). Monthly search volume 306 is a statistic indicating a number of monthly searches the advertiser may expect for a given keyword based on the basis of historical data. Maximum bids 308 determine the maximum price the advertiser is willing to pay per click for a particular keyword. Positions 310 indicate the current position of the advertiser's advertisement in a search result on the basis of the advertiser's max bid amount. Top 5 max bids 312 indicate the bid amounts for the top five bids on a given keyword. Estimated monthly clicks 314 indicate the estimated number of total clicks the advertiser may receive from a keyword based on the advertiser's max bid. Estimated monthly CPC 316 indicates the advertiser's estimated average cost-per-click on a particular keyword based on the advertiser's max bid. Estimated monthly cost 318 indicates the advertiser's estimated total monthly cost on a particular keyword based on the estimated monthly clicks and estimated CPC.

Focusing on the search term "mp3 players" 302a, which belongs to category mp3 304a, an advertiser using the bidding tool 300 may observe that search term 302a has been searched for by users of the search engine approximately 540,000 times in the preceding month, as indicated by the corresponding monthly search volume 306a. As further indicated by top five max bids 312a, top five maximum bid for search term 302a range from $0.53 to $2.00 per click. As further indicated by maximum bid 308, the advertiser must bid at least $2.01 for search term 302a to secure the most prominent placement of the advertiser's web site, among the sponsored search results. As further indicated by estimated clicks 314a, the most prominent placement position for search term 302a, may lead to approximately 17,714 clicks-through per month, with an associated monthly cost 318a for the advertiser of $35,605.14. Thus, when a user performs a search on a pay-for-placement search engine, the sponsored results are conventionally sorted and displayed based on an amount per click that a given advertiser has bid on the search term.

Because different users may provide different keywords to the search engine to find the same information, it is important for an advertiser to bid on a wide variety of search terms in order to maximize the traffic to the advertiser's website. Thus, advertisers may attempt to place bids on more than one search term to increase the likelihood that their advertisement is seen as a result of a search for the terms on which the advertiser is bidding. For example, the advertiser may decide to place bids on all search terms 302a-e shown in FIG. 3. As an advertiser's list of bided search terms grows in breadth and expansiveness, more traffic may be directed to the web site that the advertiser associates with an advertisement that the search engine displays in response to the presence of the bided search terms in user queries.

There are many similar or related search terms for which a given advertiser may have failed to place bids. As a result, the advertiser may miss opportunities for the placement of advertisements when these similar or related search terms are present in user queries. Furthermore, the search engine operator may not receive any revenue from searches performed using such search terms for which advertisers have not placed bids. Even if the advertiser was to think of as many similar terms as possible to include in its bidding, however, there may still be segments of related terms that may be considered "associated" to the terms the advertiser upon which the advertiser is bidding. The system and method for associative matching described herein builds a model and applies it to determine associated terms. Once the model is built, the application of the model to find associative terms may be referred to as associative matching or "term expansion."

Figure 4:
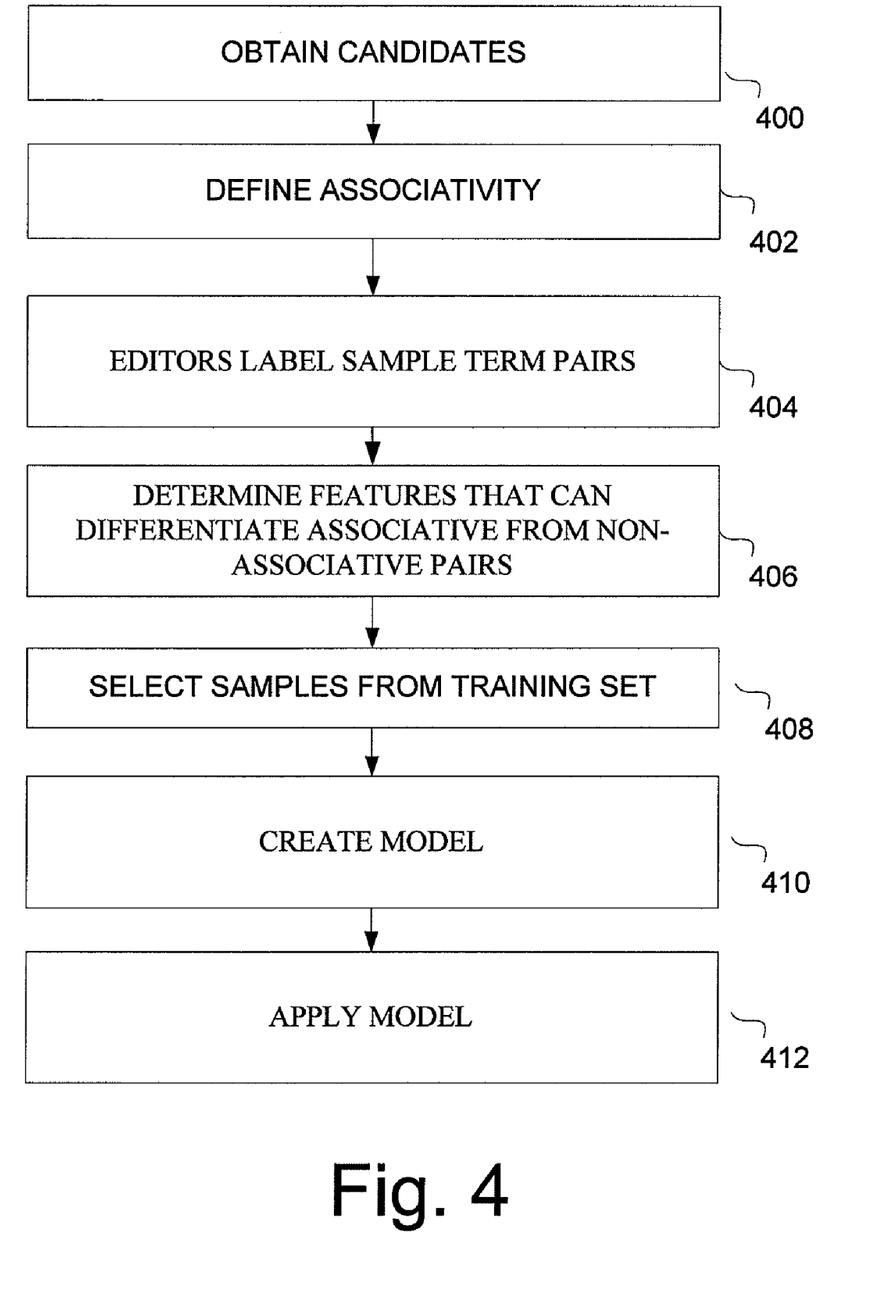
FIG. 4 is a flow diagram that illustrates a method for the performance of associative matching according to one embodiment of the present invention.

With reference to FIG. 4, a flow diagram illustrates one embodiment of a method that may be performed for associative matching 104. In step 400, candidate terms are selected for building one or more associative matching models. In one embodiment, part of step 400 includes selecting sources for associative matching or term expansion, which may be used to build the model itself. By way of example, sources for term expansion include: a database of advertising bids comprising terms upon which one or more advertisers have bid (described above); query logs from users that include logs kept from user queries; social media, such as YAHOO GROUPS®, YAHOO ANSWERS®, MYSPACE®, and other online communities; scanner data from supermarket cash register scanners; credit card usage data, or other types of data sources that contain data that may indicate an associative relationship between terms, including economic associations.

In one embodiment, a term extractor collects the terms from a source. The term extractor may rank term pairs in accordance with the number of times the terms appear close together, together on web pages, or the like. For example, a travel agency web site may be selected as a candidate source to identify associated terms related to the task of travelling. On the exemplary website, the terms "MARRIOTT HOTEL" and "DELTA AIRLINES" may appear together 100 times. Similarly, the terms "MARRIOTT HOTEL" and "AMERICAN AIRLINES" may appear 80 times. It may be deduced that the terms "MARRIOTT HOTEL" and "DELTA AIRLINES," and "MARRIOTT HOTEL" and "AMERICAN AIRLINES," respectively, are associative matches.

Specifically, suppose a web crawler and term extractor are applied to a set of web pages W, or that a term extractor alone is applied to set of structured documents. For each page P, the term extractor extracts terms $t_1, \ldots, t_n$ with positive real valued scores $s_1, \ldots, s_n$. A higher score denotes higher likelihood of a term being topical to page P. Then a score for a pair of terms $(t_i, t_j)$ needs to be monotonically increasing in the number of pages containing both terms $t_i$ and $t_j$ and also monotonically increasing in the pair-wise strength of the term extractor's term scores for terms on each page. One such function is $$\text{Score}(t_i, t_j) = \prod_{\{P: t_i, t_j \in P\}} (1 + s_i s_j)$$

Then term $t_j$ is considered to be a candidate expansion for $t_i$ from the given source when Score $(t_i, t_j)$ is high.

In the case of WIKIPEDIA (™) or other highly cross-referenced corpora with labelled topics such as WIKIPEDIA (™) article headings, two topics A and B are associative candidates when A refers often to B and B refers often to A. Letting n(A) and n(B) stand for the number of times article A refers to article B, then Score(A,B)=I(n(A)>0)I(n(B)>0)(n(A)+n(B))

Where I is the indicator function. This scoring function generalizes to any scoring function that is zero when A and B do not mutually refer to each other, and monotonically increasing in the number of times A refers to B and B refers to A.

In step 402, one or more editors label sample associative term pairs from one or more candidate sources as to whether or not a given associative criteria is met. For example, a given associative match may be based on task, based on products being complements of each other, cultural relationships, and the like. The following are several exemplary associations according to one embodiment:

"Y is associative to X if people consume X and Y around the same time."

"Y is associative to X if people consume X and Y in the same place."

"Y is associative to X if the same sorts of people consume X and Y."

"Y is associative to X if consumption of X has no value unless Y is consumed as well."

"Y is associative to X if people who buy X also buy Y."

"Y is associative to X if Y is an economic complement for X."

"Y is associative to X if people who consume X consume both X and Y but not either X or Y."

The above examples capture the concepts of temporal, local, cultural and task associations of the consumption of goods and services, which may be represented as bided search terms.

In step 404, editors label sample candidate term pairs as being related. In one embodiment, the sample term pairs are labelled according to the associative matches established in step 402. For example, for a given sample term pair, an editor determines if the sample is an associative match, and if the term pair shows an association by task, product complement or substitute, culture, or the like. Table A illustrates a database created by editors who have determined whether sample terms pair are or are not related by task.

TABLE A

| TERM 1 | TERM 2 | TASK? | PRODUCT? | STYLE? |
|---|---|---|---|---|
| toothbrush | toothpaste | Yes | Yes | No |
| oral hygiene | toothpaste | Yes | No | No |
| punk rock music | plaid pants | No | No | yes |
| luxury cruise | Tuscan vacation | No | No | yes |

In step 406, features are determined that can differentiate associative from non-associative pairs. Some exemplary features include, but are not limited to: how many advertisers bid on both terms in the pair, which may be referred to as "co-biddedness" (e.g. positive co-bidding is a good indicator of economic substitutes, since advertisers tend to be "horizontal" in the sense that they advertise many different varieties of the same good or service, rather than vertical in the selection of substitute terms); whether one or more of the terms in a related pair are brands of products or services; statistical features, and the like. In Table B, an example tuple is shown of a result table from a query of whether terms are co-bided in a database of bided search terms. In this example, a florist might co-bid the terms "flower" and "bouquet" to increase the rank of placing of an advertisement for the florist in sponsored search results, and a candy store might co-bid "candy" and "chocolate."

TABLE B

|  | Candy | Chocolates | Flowers | Bouquet |
|---|---|---|---|---|
| Candy.com | Yes | Yes | No | No |
| Florist.com | No | No | Yes | Yes |

The results of the query can be restated as follows:
Cobid(chocolates, candy)=1
Cobid(chocolates, flowers)=0
Thus, the "cobid" feature would suggest in the above example that chocolates and candy are more likely than not to be economic substitutes, but chocolates and flowers are more likely than not to be economic complements, or associative.

Alternatively, or in conjunction with the foregoing, another feature that may be considered is whether one or more of the terms in a sample pair have been categorized by a web site as being related. For example, the eBay® web site (at www.e-bay.com) provides a user with eBay® Categories to categorize products being sold on the eBay® web site. In one embodiment, if two terms appear in the same or related categories or subcategories, then this feature suggests that the two terms less likely than not to be associative. Another exemplary categorization system that may be utilized to identification associative matches between terms is the directory hierarchy that Yahoo! Directory provides. Those of skill in the art recognize that other human constructed or machine learned taxonomies may be evaluated to determine associative matches between terms.

Figure 5:
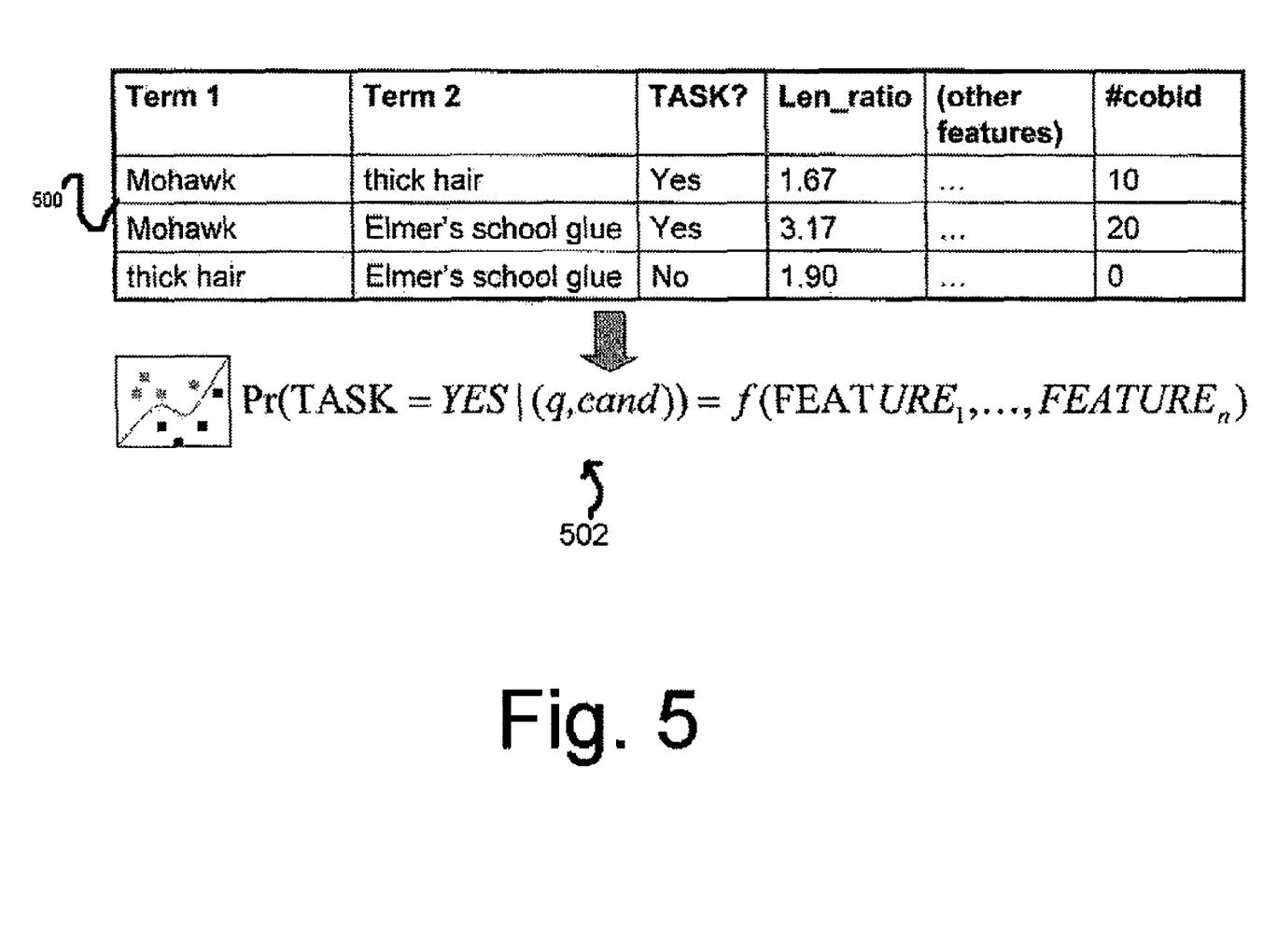
FIG. 5 is a diagram that illustrates the building of a model for determining associative matching according to one embodiment of the present invention.

In step 410, the one or more features are used to build a model. With reference to FIG. 5, a diagram illustrates the building of the model. A table of editorial determinations and probability of being related tightly. These models are named COMPETING and ASSOCIATED respectively.

COMPETING and ASSOCIATED are both built to predict specific aggregate re-combinations of editorial labels. The prediction function may be a logistic regression, although other techniques may be utilized including, but not limited to, neural networks, SVMs or other learning algorithms known to those of skill in the art. A given candidate pair (q,cand) is labelled COMPETING:yes where the pair represents a precise rewriting (e.g., the candidate term precisely matches the user's intent, preserving the core meaning of the original query while allowing for extremely minor variations in connotation or scope). Although the two forms may differ syntactically, in most cases, the matching process should be completely transparent to the user. Pairs (q,cand) are labelled ASSOCIATED:yes if got labelled TASK:yes, PRODUCT: complement, PRODUCT:substitute or STYLE:yes at the associative labelling step. Table E below shows one embodiment of how COMPETING and ASSOCIATED labels may be constructed from one or more specific editorial tasks:

TABLE E

| TERM 1 | TERM 2 | EQUIV? Term2 is semantically equivalent to term | TASK? Term2 is related by task to term 1 (Y/N) | PRODUCT? Product relationship of term 2 to term 1 (complement, substitute, neither) | STYLE? Term2 is related by taste or style or demographic to term1 (Y/N) | COMPETING? Term 2 represents a product or service that competes with Term 1 | ASSOCIATED Y/N |
|---|---|---|---|---|---|---|---|
| Toothbrush | tooth brushes | Yes | No | Neither | No | Yes | No |
| toothbrush | toothpaste | No | Yes | Complement | No | No | Yes |
| CDMA phone | TDMA phone | No | No | Substitute | No | Yes | Yes |
| punk rock music | plaid pants | No | No | Neither | Yes | No | Yes |
| luxury cruise | Tuscan vacation | No | No | Neither | Yes | No | Yes | features 500 is built according to the above-described determinations of relatedness of terms and feature selections with regard to the sample candidate query pairs. The table illustrates a non-limiting example of task-oriented relations between terms that have been analyzed. Based on this table, a model 502 is created as illustrated the in pseudo-code of FIG. 5. Given a query-candidate pair (q, cand), the solution as to whether the query and candidate is task related (Pr (TASK=YES|(q, cand)) is dependant on the function $f(FEATURE_1, \ldots, FEATURE_n)$. This associative model may be implemented as illustrated in Table C:

TABLE D $$Pr(TASK = yes) = f\left(\alpha + \sum_i \beta_i FEATURE_i\right)$$

The associative model may comprise a composite model built out of two atomic models (or "sub-models"), one of which may predict whether or not a given input query and candidate expansion have a close or identical semantic relationship. A second atomic model may predict whether or not the query and candidate expansion have a broader relationship. According to one embodiment, associative candidates have a high probability of being related broadly and a low The two atomic models, COMPETING and ASSOCIATED, calculate the probability that a given expansion (e.g., candidate) is related in a tight or broad way, respectively, to the input query. According to one embodiment, results are associative when the input query and candidate are tight and not broad in accordance with an associative model selected from the forms illustrated in Table F below. The later associative model allows for a free parameter for "tuning" the level of semantic similarity versus complementarity in the result set ranking and wherein "I" is the indicator function.

TABLE F

ASSOCIATIVE(q,cand) = (1− COMPETING(q,cand))* ASSOCIATED(q,cand)
ASSOCIATIVE(q,cand) = I(COMPETING(q,cand) < a)* ASSOCIATED(q,cand)

Given labels (which could be any of the atomic editorial labels such as TASK or a conjunction of those labels such as "TASK is 'yes' and PRODUCT is 'complement') labeling example query expansions ($q_i$,cand) with feature vector $x_i$ (containing edit distance, co-biddedness features, etc.) with normalized components in [−1,1], an associative model may be built with a Support Vector Machine by transforming the labels $L_i$ to be 1 when positive and −1 when negative, and then finding a hyperplane w which solves:

$$\text{minimize } \frac{1}{2}\|w\|^2 \text{ subject to } L_i(w \cdot x_i - b) \geq 1$$

Such a minimization may be found using quadratic programming. This machine could be improved by introducing "slack variables" $\zeta_i$ for misclassified training examples, in which case the minimization problem becomes:

$$\text{minimize } \frac{1}{2}\|w\|^2 + C\sum_i \xi_i \text{ subject to } L_i(w \cdot x_i - b) \geq 1 - \xi_i.$$

This optimization problem may be solved using the method of Lagrange Multipliers.

An associative model may also be built with a feed forward artificial neural network for the prediction of the labels $L_i$ over the feature vectors $x_i$ for the training examples ($q_i$,cand). Such a model would find a function $$f(x) = K(w_i g_i(x))$$

Where K is the hyperbolic tangent function, the $w_i$ are weights to be learned, and the gi are other basic functions. The artificial neural network is then the learned function f and weights $w_i$ that minimize the mean squared error of the predicted value and the actual training examples. This minimization can be solved using the method of gradient descent.

In step 410, the model is built and it is applied. This step may occur during use of, for example, a search engine with the model used to determine whether a new, unseen, query candidate pair is an associative match. Alternatively, query candidate pairs may be input to the model offline to generate a data store that comprises one or more associate matches that may be consulted upon receipt of a query to determine terms that are associative matches with one or more terms in the query.

Figure 6:
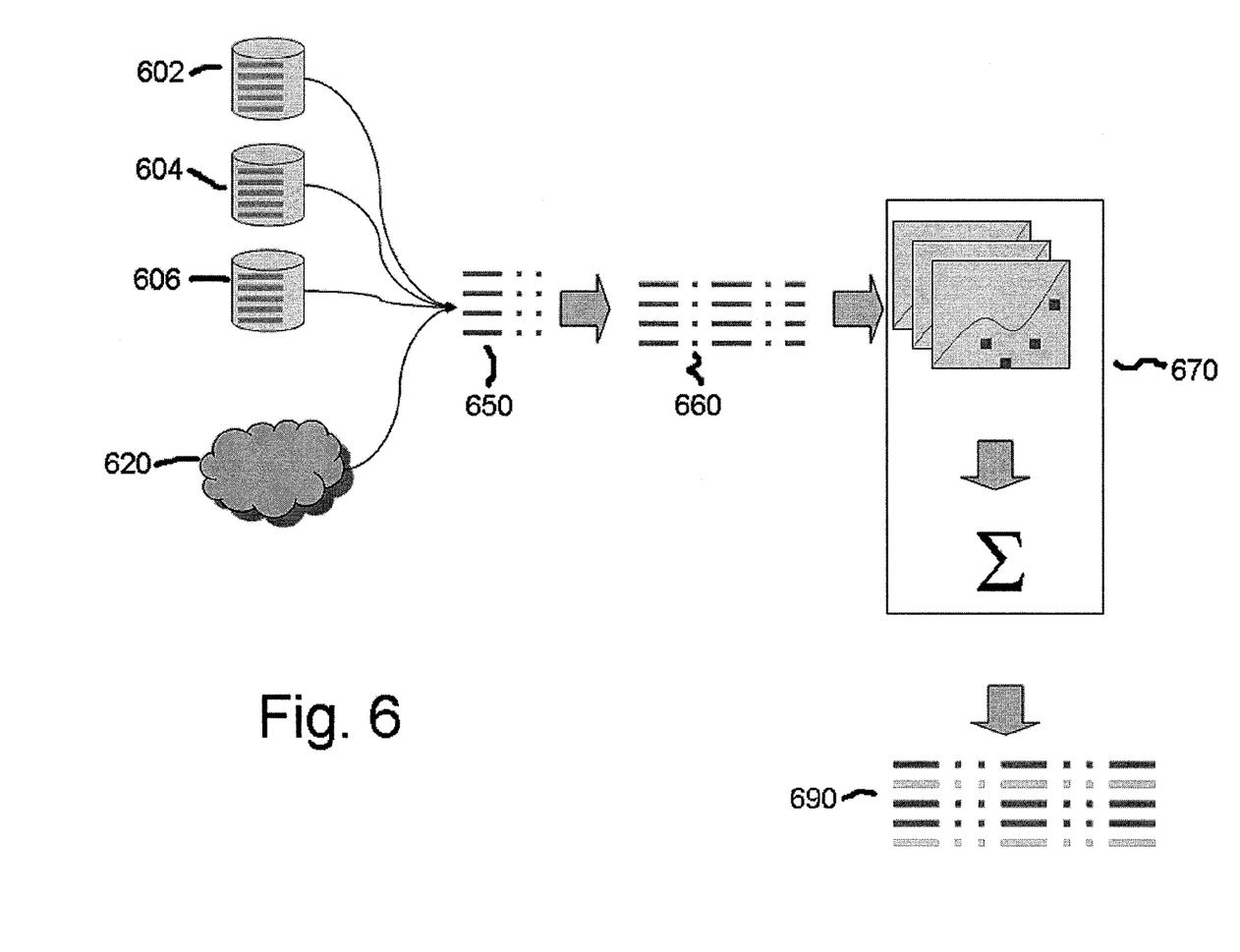
FIG. 6 is a block diagram illustrating components of a system for determining associative matching according to one embodiment of the present invention.

FIG. 6 is a system for determining associative matching according to one embodiment of the present invention, illustrating sources and storage of data models. Storage devices 602, 604, and 606 represent the candidate sources described above with respect to step 400 in FIG. 4, including addressable sources on the Internet 620. The results of step 400 comprising candidate query pairs (q, cand) are stored in a candidate database 650. The editorial selection of associative query pair samples and associated scores are stored in database 660. A model for ranking candidates that are built based on the determined features described above with respect to step 406 and 410 in FIG. 4 are stored on computer readable media or memory structure as software instructions 670.

The form of the model 670 may vary according to the embodiment implemented. For example, for one embodiment, a support vector machine ("SVM") may be used for regression of features that comprises a candidate set of potential associative matches. A SVM is a supervised learning method used for classification and regression. In other embodiments, logistic/multinomial models (e.g., a "generalized" linear model) may be used. Other embodiments contemplate the use of neural nets and decision trees. Those of skill in the art recognize that any modelling technique that works with sparse data may be implemented.

During application of the model 670, the model produces a ranked list 690 of candidate associative matches based on a received query. In one embodiment, a set number of the top ranked candidates may be used as associative matches for the received query. In one embodiment, non-desirable terms may be eliminated as matching candidates in the ranked list 650. As an example, and not by way of limitation, an advertiser who sells shoes may select certain terms as bided terms in a search engine as described above. The advertiser may bid on the word "shoe" for example. The model 670 may produce ranked results 690 that comprises competing brands with respect to the advertiser.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for identification of term or phrase pairs that are associative matches, the method comprising:
   electronically selecting one or more candidate term pairs for the construction of an associative model;
   electronically labeling the one or more candidate term pairs by matching the one or more candidate terms on the basis of associative criteria, the associative criteria comprising a complementary product relationship, a task relationship, a cultural relationship and temporal relationships;
   electronically determining one or more features for the one or more candidate term pairs;
   electronically building a model on the basis of the one or more features; and
   electronically applying the model to an unlabeled candidate term pair to determine if the pair is an associative match.

2. The method of claim 1 comprising selecting one or more sources from which the one or more candidate terms may be selected.

3. The method of claim 2 wherein the one or more sources are selected from the set of sources that include a database of advertising bids, query logs from user queries, social media, on-line communities and scanner data from receipts.

4. The method of claim 1 comprising identifying the one or more associative criteria.

5. The method of claim 1 wherein determining a given feature comprises determining co-bidedness, brand relationship and statistical features.

6. The method of claim 1 wherein building the model comprises building a first sub-model and a second sub-model.

7. The method of claim 6 wherein building the first sub-model comprises building a model to predict whether the terms of a given candidate term pair have a semantic relationship.

8. The method of claim 6 wherein building the second sub-model comprises building a model to predict whether or not the candidate term pair have a broad relationship.

9. The method of claim 6 wherein the first sub-model and the second sub-model predict specific aggregate re-combinations of one or more labels.

10. The method of claim 6 wherein the first sub-model and the second sub-model are selected from the set of models that include a logistic regression, a neural network, a decision tree and a support vector machine.

11. The method of claim 1 wherein applying the model occurs in response to a search query.

12. The method of claim 1 comprising generating a data store to maintain one or more associative matches.

13. The method of claim 12 comprising consulting the data store upon receipt of one or more query terms to determine one or more terms that are associative matches with a given one of the one or more query terms.

14. The method of claim 1 wherein the model is selected from the set of models that include a logistic regression, a neural network, a decision tree and a support vector machine.

15. Computer readable media comprising program code that when executed by a programmable processor causes the processor to execution a method for identification of term or phrase pairs that are associative matches, the computer readable media comprising:
   program code stored on physical computer readable media for selecting one or more candidate term pairs for the construction of an associative model;
   program code stored on physical computer readable media for labeling the one or more candidate term pairs by matching the one or more candidate terms on the basis of associative criteria, the associative criteria comprising a complementary product relationship, a task relationship, a cultural relationship and temporal relationships;
   program code stored on physical computer readable media for determining one or more features for the one or more candidate term pairs;
   program code stored on physical computer readable media for building a model on the basis of the one or more features; and
   program code stored on physical computer readable media for applying the model to an unlabeled candidate term pair to determine if the pair is an associative match.

16. The computer readable media of claim 15 comprising program code for selecting one or more sources from which the one or more candidate terms may be selected.

17. The computer readable media of claim 16 wherein the one or more sources are selected from the set of sources that include a database of advertising bids, query logs from user queries, social media, on-line communities and scanner data from receipts.

18. The computer readable media of claim 15 comprising program code for identifying the one or more associative criteria.

19. The computer readable media of claim 15 wherein program code for determining a given feature comprises program code for determining co-bidedness, brand relationship and statistical features.

20. The computer readable media of claim 15 wherein program code for building the model comprises program code for building a first sub-model and a second sub-model.

21. The computer readable media of claim 20 wherein program code for building the first sub-model comprises program code for building a model to predict whether the terms of a given candidate term pair have a semantic relationship.

22. The computer readable media of claim 20 wherein program code for building the second sub-model comprises program code for building a model to predict whether or not the candidate term pair have a broad relationship.

23. The computer readable media of claim 20 wherein the first sub-model and the second sub-model predict specific aggregate re-combinations of one or more labels.

24. The computer readable media of claim 20 wherein the first sub-model and the second sub-model are selected from the set of models that include a logistic regression, a neural network, a decision tree and a support vector machine.

25. The computer readable media of claim 20 wherein program code for applying the model is executed by the processor in response to a search query.

26. The computer readable media of claim 15 comprising program code for consulting the data store upon receipt of one or more query terms to determine one or more terms that are associative matches with a given one of the one or more query terms.

27. The computer readable media of claim 15 comprising program code for generating a data store to maintain one or more associative matches.

28. The computer readable media of claim 15 wherein program code for building a model is selected form the set of models that include a logistic regression, a neural network, a decision tree and a support vector machine.

* * * * *